United States Patent [19]

Marchione

[11] 3,929,034

[45] Dec. 30, 1975

[54] ROTATING SYSTEM

[76] Inventor: Guido Marchione, 3 Via G. Leopardi, Trieste, Italy

[22] Filed: Apr. 29, 1974

[21] Appl. No.: 464,891

[52] U.S. Cl. ............... 74/575; 74/577 M; 74/577 S
[51] Int. Cl.² ..................... G05G 1/00; G05G 3/00
[58] Field of Search ............... 74/575, 577 S, 577 M

[56] References Cited
UNITED STATES PATENTS

| | | |
|---|---|---|
| 2,153,556 | 4/1939 | Gartin.............................. 74/557 S |
| 3,285,094 | 11/1966 | Aschwanden..................... 74/575 X |
| 3,875,812 | 4/1975 | Chiabrandy...................... 74/577 X |

*Primary Examiner*—Leonard H. Gerin
*Attorney, Agent, or Firm*—William Anthony Drucker

[57] ABSTRACT

A system which allows a discordance and alternation of motion to two side by side wheels rotating upon the same axle.

1 Claim, 12 Drawing Figures

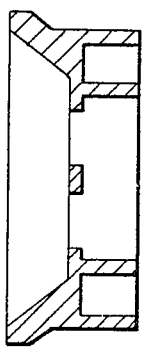 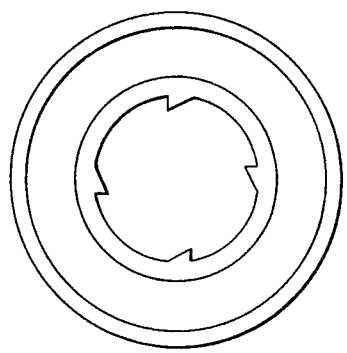
Fig. 1A  Fig. 1B
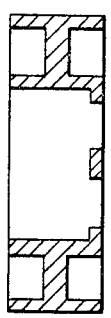 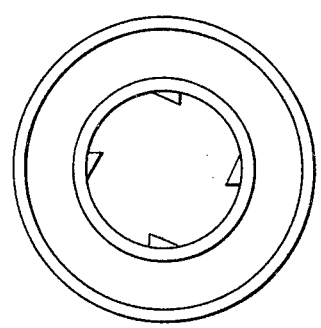
Fig. 2A  Fig. 2B
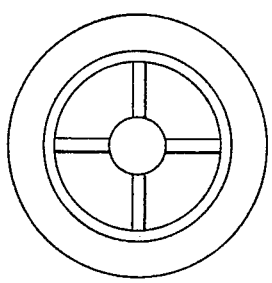 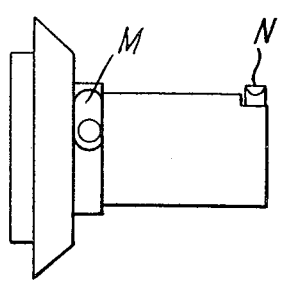 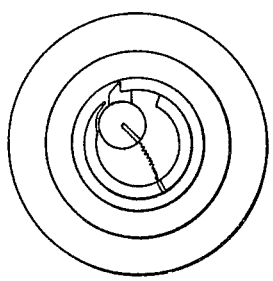
Fig. 3B  Fig. 3A  Fig. 3C
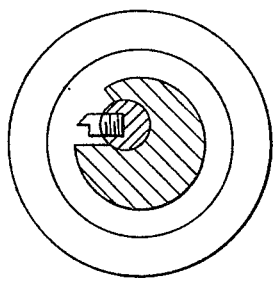 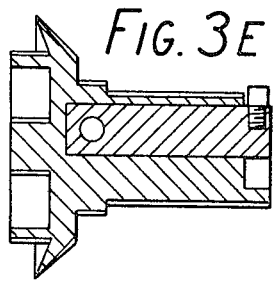
Fig. 3D  Fig. 3E
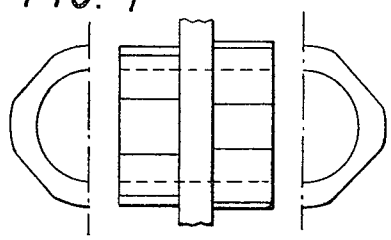 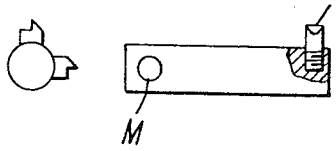
Fig. 4  Fig. 5B  Fig. 5A

ROTATING SYSTEM

The invention permits to obtain the revolution by means of a single axle of two wheels which, by changing the direction of the movement of said axle, can assume alternatively the function either of driven or driving wheel.

At present, if it is wished to make use of two alternate and contrary motions, for example for the unwinding and rewinding of tapes or motion picture films, recourse must generally be made to two separate wheels fastened upon two separate axles, which can develop the alternate function of driven and driving axles, as a result only of oppropriate connections by means of gearwheels or driving gear, with clutch.

In the case of typical applications where the wheels must be necessarily side by side, for instance, in automatic loaders for motion pictures cameras, by a reduced pitch, the alternate motion of the two wheels, one of which is fastened upon the single axle and the other necessarily idling, would only be obtainable by resorting to systems of clutch which would absorb much higher powers than those economically and functionally available today.

The system of the present invention permits instead to put in motion, by the same axle, two separate wheels disposed side by side which can be either integral with or idling on the same axle, without resorting to difficult constructional systems or requiring in any case powers higher than those normally employed.

An embodiment is shown in the accompanying drawing, and comprises:

A main wheel (FIG. 1A,1B)
A secondary wheel (FIG. 2A,2B)
A main axle (FIG. 3A,3B,3C,3D,3E) containing, in turn, an eccentric axle of a minor diameter (FIG. 5A,5B)
A support either for the main axle or the two wheels (FIG. 4).

The running is conducted as follows: the main axle is made to move, clock-wise or in the opposite direction, by means of an external motor which is engaged by means of projections, which rest in appropriate housings, available on its head (FIG. 3B,3E).

During its movement, considered for the present to be clockwise, pallet M (FIG. 3A,5A) incorporated on the eccentric axle, bears on one of the teeth projecting from the inner shape of the main wheel (FIG. 1A, 1B) which, propelled solidly by the main axle, will act as a driving wheel; pallet N (FIG. 3A,5A) also incorporated on the eccentric axle but offset from the former by a 90° angle, will re-enter the housing as is available in the shape of the main axle (FIG. 3C), and thereupon the secondary wheel (FIG. 2A,2B) will act as a driven wheel by rotating idly on the axle, and with a rotation speed which can be higher or lower than that of the axle itself.

In the case of reversal of the running of the main axle it will happen that pallet M (FIG. 3A,5A) is pushed by the teeth of the main wheel to drop again into the housing, available in the shape of the main axle (FIG. 3D,3A), at the same time recalling pallet N (FIG. 3A,5A) which bears on one of the teeth of the secondary wheel (FIG. 2A,2B) propelling it integrally with the motion of the main axle.

Obviously thereby the secondary wheel will become the driving wheel, whereas the main wheel will turn to idling in respect of the axle, by functioning in such a way as a driven wheel, and with the same consideration as have been made above for the opposite case.

The two wheels and the main axle are preferably made of light metal (duralumin type) or of synthetic plastics material, whereas the eccentric axle and the support may advantageously be of bronze or other antifriction material.

The eccentric axle already provided with pallet N, whereas the one M will be subsequently screwed down, is inserted into the housing pre-arranged in the shape of the main axle, by an eccentricity which is variable according to either the dimensions or the use to which the entire system is to be put, but in any way so that the two pallets therein incorporated must jut out adequately with their own profile from the profile of the main axle, in the case of a hooking and dragging operation, whereas they disappear completely if it is a question of the opposite function.

The number of teeth jutting out from the inner profiles of the wheels will vary according to the promptness wished to be obtained in alternating the movement, and therefore the function of the wheels themselves, but from tests performed it is deemed that the best maximum number is eight.

In order to make easier a prompt response of the eccentric axle upon the inversion of the movement of the main axle, the two axles are connected by means of a spring with a low-powered blade (FIG. 3C) lodged into the opposite housing, which is available on the main axle head (FIG. 3C,3D).

The above said spring is also entrusted with the task of keeping the two pallets jutting out at the same time from their respective dissappearance housings, by preventing when the axle is at a stop any movement of the wheels.

The length of the main axle can vary according to the use which the system is entrusted with, and the dimensions of the two wheels may similarly vary, as also the support (FIG. 4), by keeping in mind that, at any rate, it is requisite to create a support for the secondary wheel in order to keep it in a position similar to that of the main one.

The increasing in diameter of a portion of the central shape of the main axle, where the pallet M housing is (FIG. 3A, 3E), is caused by the necessity of creating a wing able to avoid excessive lateral friction in the sliding of the main wheel.

The above said increase would result needlessly if the main axle abutted with its head, opposed to the one where the hooking with the dragging axle occurs, upon a stiff supporting surface, or upon a thrust block system.

I claim:

1. In an assembly of an axle, a first member rotatably journalled on said axle, and a second member rotatably journalled on said axle, the improvement which comprises, in combination, a first set of ratchet teeth projecting radially inwards on said first member, a second set of ratchet teeth projecting radially inward on said second member, said first and second sets of ratchet teeth being arranged for relatively opposite directions of drive and escapement about said axle, a pawl carrier housed in said axle, a first pawl on said carrier positioned in alignment with said first set of ratchet teeth, a second pawl on said carrier positioned in alignment with said second set of ratchet teeth, said second pawl being angularly offset from said first pawl, said pawl carrier being rotatable about an axis parallel to the axis of said axle into a first limiting position in which said first pawl projects from said axle and engages with a tooth of said first set of ratchet teeth whilst said second pawl is spaced from said second set of ratchet teeth, and a second limiting position in which said first pawl is spaced from said first set of ratchet teeth whilst said second pawl projects from said axle and engages with a tooth of said second set of ratchet teeth.

* * * * *